(12) United States Patent
Chernogorski

(10) Patent No.: US 11,277,056 B2
(45) Date of Patent: Mar. 15, 2022

(54) FLUID-COOLED ROTOR FOR AN ELECTRIC MACHINE

(71) Applicant: AUDI AG, Ingolstadt (DE)

(72) Inventor: Vladimir Chernogorski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 177 days.

(21) Appl. No.: 16/687,949

(22) Filed: Nov. 19, 2019

(65) Prior Publication Data
US 2020/0220432 A1   Jul. 9, 2020

(30) Foreign Application Priority Data

Jan. 7, 2019   (DE) .................. 102019200098.3

(51) Int. Cl.
*H02K 9/19* (2006.01)
*H02K 17/16* (2006.01)
*H02K 3/47* (2006.01)
*H02K 1/32* (2006.01)

(52) U.S. Cl.
CPC ............. *H02K 9/19* (2013.01); *H02K 1/32* (2013.01); *H02K 3/47* (2013.01); *H02K 17/165* (2013.01)

(58) Field of Classification Search
CPC ........ H02K 9/19; H02K 3/47; H02K 17/165; H02K 1/32; H02K 17/16
See application file for complete search history.

(56) References Cited

U.S. PATENT DOCUMENTS

| 1,448,700 | A | 3/1923 | Seidner |
| 4,311,932 | A | 1/1982 | Olson |
| 2015/0280525 | A1 | 10/2015 | Rippel et al. |
| 2017/0288489 | A1 | 10/2017 | Shiraki et al. |

FOREIGN PATENT DOCUMENTS

| CN | 103187829 A | 7/2013 | |
| DE | 102012203697 A1 | 9/2013 | |
| DE | 102014018223 A1 * | 6/2015 | ............... H02K 3/24 |
| DE | 102016208770 A1 | 11/2017 | |
| DE | 102016216479 A1 | 3/2018 | |
| EP | 3142231 A1 | 3/2017 | |
| EP | 3379696 A1 * | 9/2018 | ............. F03D 80/80 |
| GB | 877743 A | 9/1961 | |
| JP | 2013-243935 A | 12/2013 | |

OTHER PUBLICATIONS

German Examination Report dated Jul. 18, 2019 in corresponding German Application No. 10 2019 200 098.3; 20 pages; Machine translation attached.
Office Action dated Dec. 2, 2021, in connection with corresponding Chinese Application No. 202010014428.7 (16 pp., including machine-generated English translation).

* cited by examiner

*Primary Examiner* — Quyen P Leung
*Assistant Examiner* — Christopher Stephen Schaller
(74) *Attorney, Agent, or Firm* — Maier & Maier, PLLC

(57) ABSTRACT

A fluid-cooled rotor for an electric machine and an asynchronous machine with a rotor winding cooled directly or close to a loss.

8 Claims, 2 Drawing Sheets

FLUID-COOLED ROTOR FOR AN ELECTRIC MACHINE

FIELD

The invention relates to a fluid-cooled rotor for an electric machine and an asynchronous machine (ASM) with a rotor cooled directly or close to a loss.

BACKGROUND

In an asynchronous machine (ASM), the power is mainly limited by the temperature in the rotor. Reducing the rotor temperature allows for increasing the power density of the electric machine. The power losses occurring in the rotor are higher when compared with other types of machines (permanent magnet synchronous machines (PMSM) or separately excited synchronous machines (SESM)). Moreover, the rotor is not as easily cooled due to the rotational movement.

In the current state of the art, the ASM rotor is indirectly cooled by means of shaft cooling. Most of the heat is generated close to the rotor surface and needs to be transferred from the surface via the laminated core to the shaft and only then to the fluid, which limits cooling capacity.

DE 10 2012 203 697 A1 discloses an asynchronous machine with a stator and a rotor rotatably mounted about a rotation axis. A shaft, upon which the rotor is mounted, has an axial bore connected to a coolant circuit through which a cooling fluid is led through the shaft.

A double-walled hollow rotor shaft is known from DE 10 2016 216 479 A1. The double wall improves heat distribution at the jacket of the rotor shaft.

EP 3 142 231 A1 discloses an air-cooled electric power generator, whose rotor has an inner cylinder attached to the shaft and an outer cylinder mounted thereon by means of transverse support flanges. Permanent magnets are attached to an outer surface of the outer cylinder. The air gap between the rotor and the stator forms an air-flow cooling duct.

US 2017/288489 A1 describes a coreless rotating electric machine comprising a stator with a cylindrical coil, as well as a cooling method for the electric machine. The stator comprises a cylindrical winding formed as a laminate structure of conductive sheets, and a rotor enclosing the cylindrical winding and forming an air gap. Cooling is achieved by introducing a coolant into the air gap.

DE 10 2016 208 770 A1 describes an electric machine designed as an asynchronous machine, which is supplied with a cooling medium via a hollow shaft, wherein the cooling medium exits through radial openings in the shaft, thereby cooling short-circuit rings situated on the end faces of the rotor and winding heads situated on the end faces of the stator.

JP 2013/243 935 A presents a lubricating and cooling structure for an electric motor, which prevents a large amount of lubricant or coolant from flowing into an air gap between a stator and a rotor. An annular stator is attached to a housing, and a rotor is arranged separately by means of an air gap on a radial inner side of the stator. A rotor base of the rotor has an inner cylindrical portion attached to a rotor shaft; an extension from the inner cylindrical portion toward a radially outer side; a first outer cylindrical portion designed to project toward a first axial side of the extension; and a second outer cylindrical portion designed to project toward a second axial side of the extension. The extension has a through-hole formed therein, which passes through the extension from the first axial side to the second axial side. An inner peripheral surface of the second outer cylindrical portion has a larger radius than does an inner peripheral surface of the first outer cylindrical portion. A lubricant or a coolant is passed through the through-hole, from the inner peripheral surface of the first outer cylindrical portion to the inner peripheral surface of the second outer cylindrical portion.

Passing the cooling fluid through the laminated core is being contemplated. Although this variant improves cooling performance, it fails due to the insufficient tightness of the laminated core. Coolant seeps through the plates in the direction of the air gap, where very high hydraulic losses occur, due to the very high relative speed between the stator and the rotor (up to 125-140 m/s). This may even lead to machine failure.

SUMMARY

Hence, the object of the invention is to provide a device with improved cooling.

According to the invention, the rotor is surrounded by a hollow cylinder for sealing and fluid passage. In the asynchronous machine, the cylinder is situated in the air gap between the rotor and the stator. This enables the coolant to flow through the laminated core of the rotor, while preventing it from entering the air gap.

The subject-matter of the invention is a fluid-cooled rotor for an electric machine. The rotor comprises a hollow shaft for passing a cooling fluid and having at least one radial outlet duct for the cooling fluid. The hollow shaft of one embodiment comprises several outlet ducts for the cooling fluid. In a further embodiment, the hollow shaft has at least one radial inlet duct for the cooling fluid. The hollow shaft of a further embodiment comprises several radial inlet ducts for the cooling fluid. The hollow shaft of one embodiment comprises several outlet and inlet ducts for the cooling fluid. A radial duct as intended by invention is a duct in the wall of the hollow shaft, through which a cooling fluid may flow in a direction, which does not coincide with the axis of rotation of the hollow shaft. In a special variant, the direction of flow is perpendicular to the axis of rotation.

A laminated core is mounted on the hollow shaft. The laminated core is made up of a plurality of superimposed plates composed of a thin sheet metal. Each plate has a number of grooves in order to accommodate non-ferrous metal rods. The metal rods of the rotor are connected at either end by metallic short-circuit rings. The metal rods and the short-circuit rings together form the squirrel cage of the rotor. In one embodiment of the rotor, the individual plates of the laminated core are superimposed in a mutually aligned fashion. In another embodiment of the rotor, the individual plates of the laminated core are superimposed slightly rotated, such that the grooves of the laminated core provided for accommodating the metal rods extend obliquely to the longitudinal axis of the rotor.

According to the invention, the circumferential surface of the rotor is formed by an air-gap cylinder, which seals the rotor in the radial direction toward the outside and prevents the cooling fluid from draining from the rotor in the radial direction. In one embodiment, the air-gap cylinder consists of a non-magnetic material. The air-gap cylinder serves to pass the fluid in the rotor and seal the rotor. If the rotor is to be cooled by a cooling fluid on or near its surface, the cooling fluid will have to be guided along the rotor shaft and through the rotor. The laminated core is assembled from many thin plates. Therefore, the laminated core is not tight and at high (peripheral) speeds, the cooling fluid penetrates between the plates of the laminated core and into the air gap of the electric machine. The air gap represents the air space between the stator and the rotor. This results in the following: Since the air gap is very narrow, some 0.6 to 1.2 mm, high hydraulic losses come about there, due to the high shear forces between the (stationary) stator and the (rotating) rotor. Higher density of the cooling fluid means higher hydraulic losses, i.e., low for air, high for liquids. Losses result in heat that needs to be dissipated again, as well as energy consumption, which has a negative impact on range, e.g., for electrically driven vehicles. Therefore, liquids entering the air gap needs to be avoided. The air-gap cylinder is attached to the rotor and co-rotates therewith. Radial leakage flows in the rotor are intercepted by the air-gap cylinder and redirected in the axial direction. Thus, cooling fluid cannot enter the air gap. The cooling fluid can be conducted directly to the source of loss (squirrel cage, rotor surface). This would not be possible without the air-gap protection.

The air-gap cylinder allows for cooling concepts, wherein larger leakage flows of the cooling fluid occur in the laminated core. In one embodiment, the laminated core has axial cooling ducts, which are flooded with cooling fluid during operation of the electric machine. In a further embodiment, one or more cooling ducts are arranged between the laminated core and the air-gap cylinder. For example, a cooling duct may be formed by recesses in the surface of the laminated core. Due to the centrifugal forces during rotor rotation, high pressures are generated in the cooling fluid (e.g., more than 30 bar), which increase the leakage rate.

In one embodiment, the axial cooling fluid flow is ejected into the winding head space of the stator, i.e., the fluid is ejected into the interior of the electric machine. In this variant, the cooling fluid makes contact with the stator winding.

In another embodiment, the axial flow of the cooling fluid is returned to the hollow shaft of the rotor. By means of at least one radial outlet duct, i.e., a bore in the hollow shaft, cooling fluid is led into the active part of the rotor containing the laminated core and the squirrel cage. The fluid flows axially along the shaft through the rotor and cools it. At the opposite end of the rotor, the cooling fluid is passed through at least one radial inlet duct and back into the hollow shaft. The cooling fluid is made to reassume a small diameter. This allows for recovering the energy used to accelerate the cooling fluid and minimizing losses.

In one embodiment, sealing elements are arranged between the hollow shaft and the air-gap cylinder at the end faces of the air-gap cylinder. The sealing elements prevent the cooling fluid from flowing in the axial direction out of the rotor in the areas covered thereby. In one embodiment, the air-gap cylinder and the sealing elements along with the hollow shaft define a closed space, in which the rotor to be cooled is located. Cooling fluid can only escape from this space via the inside of the hollow shaft, i.e., it is prevented from escaping into an area outside the hollow shaft. Thus, a sealed space is formed, which ensures that the cooling fluid remains only within the rotor space and will not enter the interior of the electric motor. This also allows for the use of cooling fluids, which must not contact any current-conducting parts, such as the stator winding.

Since no cooling fluid enters the interior of the electric machine, different cooling fluids may be used. Examples include air, water-glycol mixtures, transmission oils, such as manual transmission fluid (MTF) or automatic transmission fluid (ATF) without the need for special measures to protect the stator winding or other axle components. In one embodiment, the cooling fluid is a liquid. In a further embodiment, the cooling fluid is a water-glycol mixture. In another embodiment, the cooling fluid is a transmission oil.

In one embodiment, at least one radial outlet duct and at least one radial inlet duct of the hollow shaft are arranged outside the area of the hollow shaft covered by the laminated core in the space enclosed by the air cylinder. This allows for complete flow through the rotor in the axial direction along the hollow shaft. However, additional cooling ducts may also be realized at any location in the laminated core without any risk of the cooling fluid escaping.

The rotor according to the invention makes it possible to reduce the temperature of the rotor considerably. This allows for increasing the power density and reducing the material costs of the electric machine.

A further subject matter of the invention is an asynchronous machine (ASM), which comprises a stator and a rotor according to the invention, and which is rotatably arranged about an axis of rotation relative to the stator. The air-gap cylinder of the rotor is located in the air gap between the rotor and the stator. The air-gap cylinder prevents cooling fluid from escaping from the rotor into the air gap and causing hydraulic losses there, due to the shear forces occurring then between the rotor and the stator.

Further advantages and embodiments of the invention will become apparent from the description and the accompanying drawings.

Naturally, the above-mentioned features and the features to be explained below may be used not only in the specified combination, but also in other combinations or separately, without departing from the scope of the present invention.

BRIEF DESCRIPTION OF THE DRAWINGS

The invention is schematically illustrated in the attached drawings of the embodiments and will be described with reference to the drawings. In the drawings.

DETAILED DESCRIPTION

Figure 1:
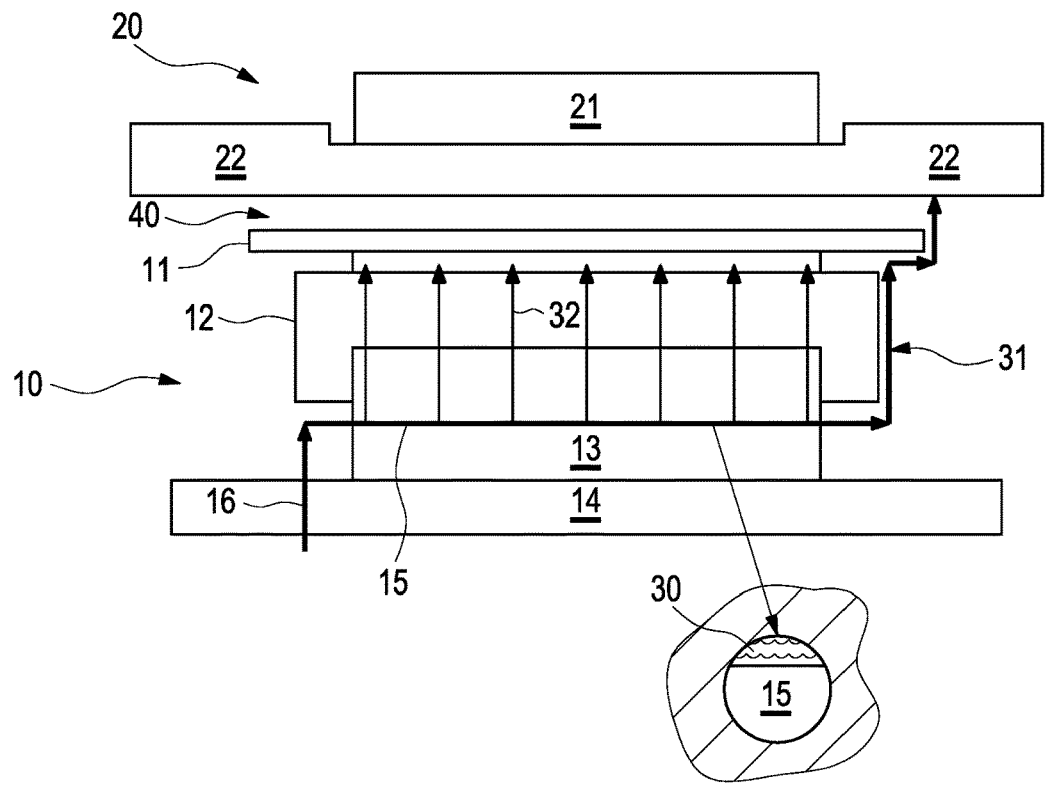
FIG. 1 is a schematic representation of a longitudinal section through an asynchronous machine with an embodiment of the rotor according to the invention, where the flow paths of a cooling fluid are plotted.

FIG. 1 shows an asynchronous machine with a stator 20 and an embodiment of the rotor 10 according to the invention in longitudinal section. Since the asynchronous machine is designed symmetrically to the axis of rotation of the rotor 10, FIG. 1 only shows the upper half of the asynchronous machine. The stator 20 includes a laminated stator core 21 and winding heads 22. The rotor 10 is arranged inside stator 20; the air gap 40 is located between rotor 10 and stator 20.

An air-gap cylinder 11 made of a non-magnetic material is mounted around rotor 10. It seals the rotor 10 toward the outside, barring any cooling fluid from reaching the air gap 40 of the electric machine and near or inside the laminated stator core 21, and it furthermore serves as a fluid guide. The rotor core 13 is arranged on the hollow rotor shaft 14 and is made up of many thin plates. The squirrel cage 12 is located on the laminated core 13. A cooling duct 15, the cross-section of which is shown in the enlarged detail, is provided in the laminated core 13.

The flow path of the cooling fluid is indicated in FIG. 1 by arrows. A fluid-supply line 16 leads cooling fluid from the interior of the hollow shaft 14 into the active part of the rotor 10 to be cooled. The cooling fluid flows through the cooling duct 15 in the axial direction to the opposite end face of the laminated core 13. Part of the cooling fluid penetrates between the blades of the laminated core 13 and flows outward as a leakage flow 32 in the radial direction. Where the leakage flow 32 meets the air-gap cylinder 11, it is redirected in the axial direction. The main flow 31 of the coolant extends from the rotor into the space defined by a winding head 22 of the stator 20, i.e., the fluid is discharged into the interior of the electric machine.

Figure 2:
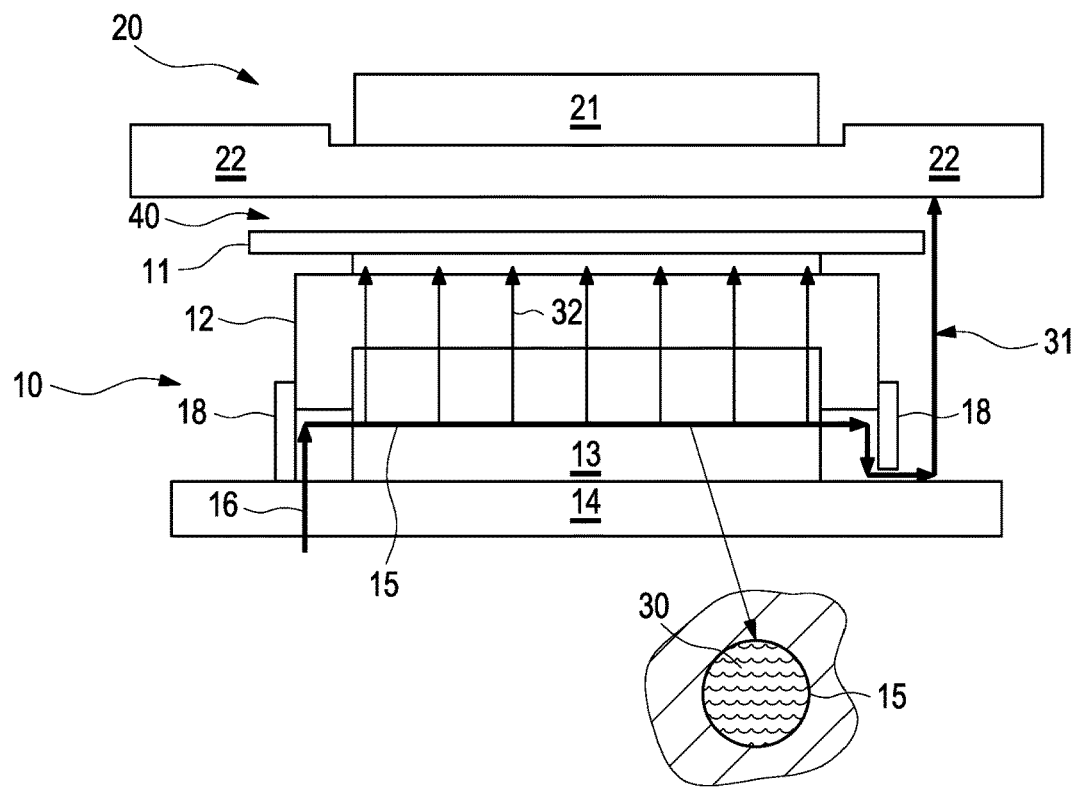
FIG. 2 is a schematic representation of a longitudinal section through an asynchronous machine with another embodiment of the rotor according to the invention, where the flow paths of a cooling fluid are plotted.

FIG. 2 shows the upper half of an asynchronous machine with a stator 20 and another embodiment of the rotor 10 according to the invention in longitudinal section.

The cross-section of a cooling duct 15 in the laminated core 13 is shown in the enlarged detail. In the embodiment shown in FIG. 2, the cooling duct 15 is completely filled with cooling fluid 30 in order to generate a larger leakage flow 32 of the cooling fluid through the laminated core 13.

The flow path of the cooling fluid is indicated in FIG. 2 by arrows. A fluid-supply line 16 leads cooling fluid from the interior of the hollow shaft 14 into the active part of the rotor 10 to be cooled. Sealing elements 18 on the end faces prevent the cooling fluid from escaping from the rotor 10 in axial direction in the areas covered thereby. The main flow 31 of the cooling fluid extends through the cooling duct 15 in axial direction to the opposite end face of the laminated core 13, where it is redirected back to the hollow shaft 14, and exits the rotor near the axis of rotation into the space defined by a winding head 22 of the stator 20, i.e., the fluid is discharged into the interior of the electric machine. Kinetic energy is recovered by redirecting the fluid flow 31 back to the hollow shaft.

Figure 3:
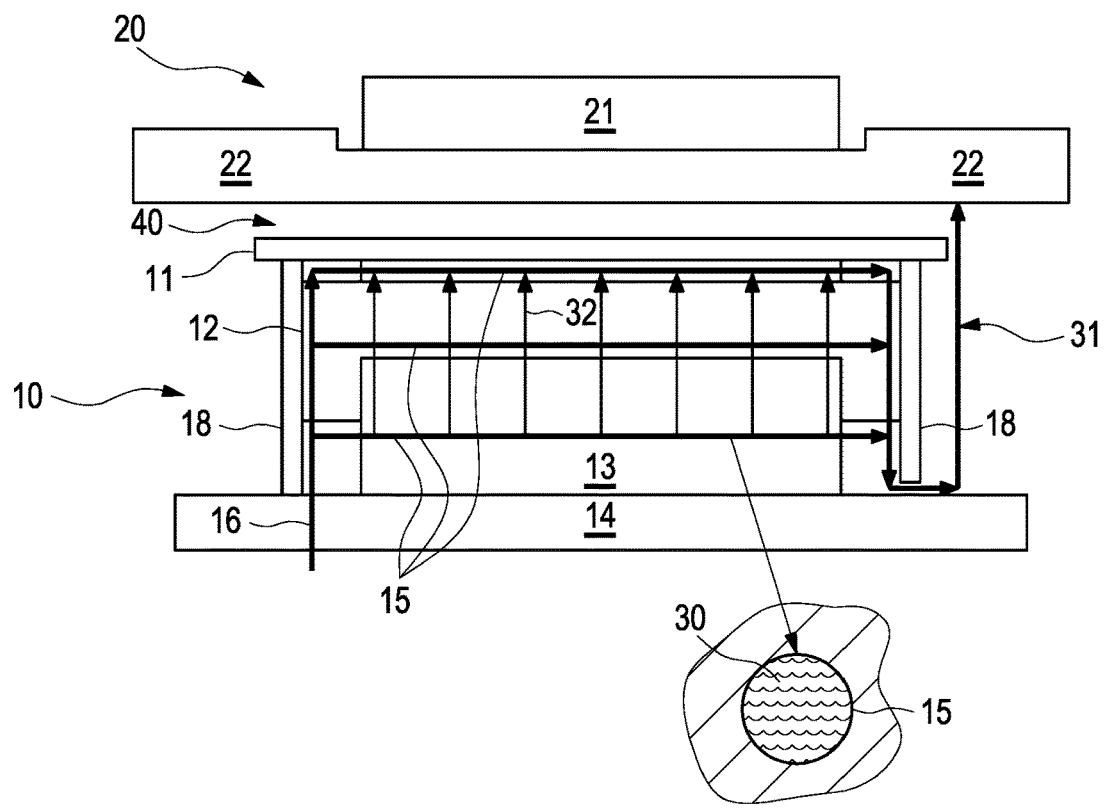
FIG. 3 is a schematic representation of a longitudinal section through an asynchronous machine with a further embodiment of the rotor according to the invention, where the flow paths of a cooling fluid are plotted.

FIG. 3 shows the upper half of an asynchronous machine with a stator 20 and another embodiment of rotor 10 according to the invention in longitudinal section.

Several axial cooling ducts 15 extend through the laminated core 13 and the squirrel cage 12 at different radial distances from the axis of rotation of the rotor 10. The cross-section of a cooling duct 15 in the rotor core 13 is shown in the enlarged detail. In the embodiment shown in FIG. 3, the cooling duct 15 is completely filled with cooling fluid 30 in order to generate a larger leakage flow 32 of the cooling fluid through the laminated core 13.

The flow path of the cooling fluid is indicated in FIG. 3 by arrows. A fluid-supply line 16 leads cooling fluid from the interior of the hollow shaft 14 into the active part of the rotor 10 to be cooled. Sealing elements 18 on the end faces prevent the cooling fluid from escaping from the rotor 10 in the axial direction in the areas covered thereby. The main flow 31 of the cooling fluid extends through the cooling ducts 15 and along the inside of the air-gap cylinder 11 in axial direction to the opposite end face of the laminated core 13, where it is redirected back to the hollow shaft 14, and exits the rotor near the axis of rotation into the space defined by a winding head 22 of the stator 20, i.e., the fluid is discharged into the interior of the electric machine. Kinetic energy is recovered by redirecting the fluid flow 31 back to the hollow shaft.

Figure 4:
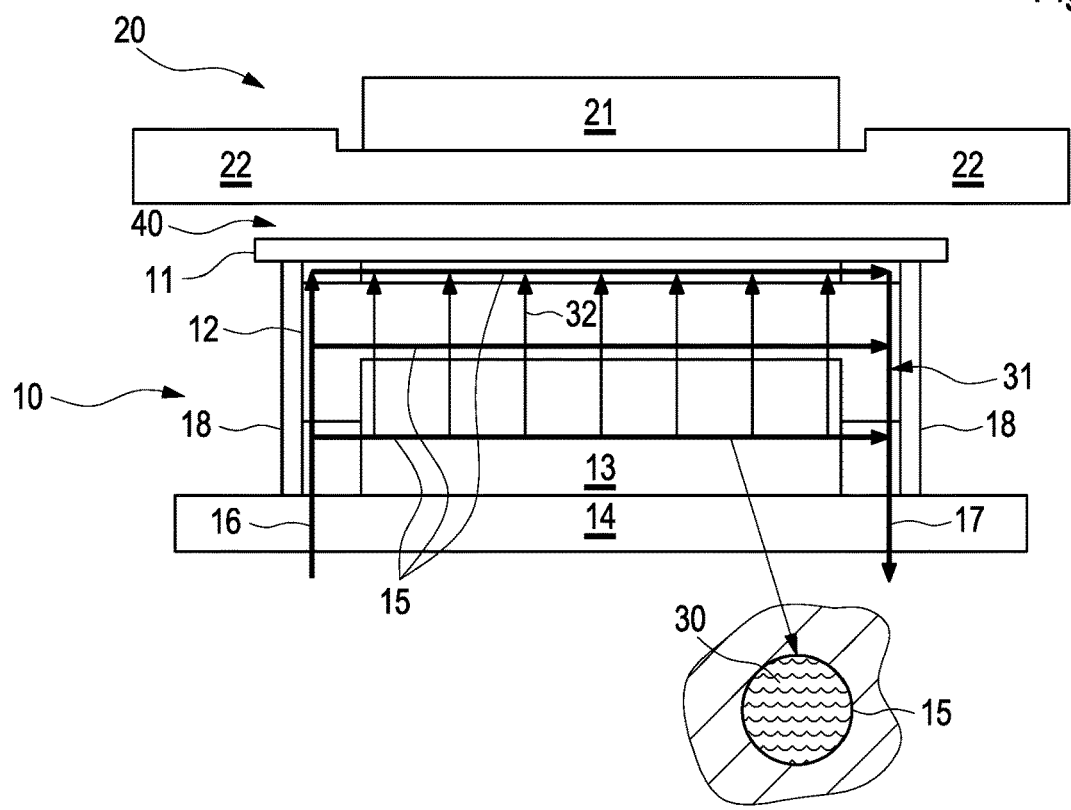
FIG. 4 is a schematic representation of a longitudinal section through an asynchronous machine with another embodiment of the rotor according to the invention, where the flow paths of a cooling fluid are plotted.

FIG. 4 shows the upper half of an asynchronous machine with a stator 20 and another embodiment of the rotor 10 according to the invention in longitudinal section.

Several axial cooling ducts 15 extend through the laminated core 13 and the squirrel cage 12 at different radial distances from the axis of rotation of the rotor 10. The cross-section of a cooling duct 15 in the rotor core 13 is shown in the enlarged detail. In the embodiment shown in FIG. 4, the cooling duct 15 is completely filled with cooling fluid 30 in order to generate a larger leakage flow 32 of the cooling fluid through the laminated core 13.

The flow path of the cooling fluid is indicated in FIG. 4 by arrows. A fluid-supply line 16 leads cooling fluid from the interior of the hollow shaft 14 into the active part of the rotor 10 to be cooled. Sealing elements 18 on either end face prevent the cooling fluid from escaping from the rotor 10 in the axial direction. The main flow 31 of the cooling fluid extends through the cooling ducts 15 and along the inside of the air-gap cylinder 11 in axial direction to the opposite end face of the laminated core 13, where it is redirected back to the hollow shaft 14 and flows back through a fluid-return line 17 into the hollow shaft 14. As a result, no cooling fluid enters the interior of the asynchronous machine.

REFERENCE NUMERAL LIST

10 Rotor
11 Air-gap cylinder
12 Squirrel cage
13 Laminated core
14 Hollow shaft
15 Cooling duct
16 Fluid-supply line
17 Fluid-return line
18 Sealing element
20 Stator
21 Laminated stator core
22 Winding head
30 Cooling fluid
31 Main flow cooling fluid
32 Leakage flow cooling fluid
40 Air gap

The invention claimed is:
1. A fluid-cooled rotor for an electric machine, comprising:
a hollow shaft for passage of a cooling fluid, wherein the hollow shaft has at least one radial outlet channel for the cooling fluid;
a laminated core mounted on the hollow shaft, and on which a squirrel cage is arranged,
wherein a circumferential surface of the rotor is formed by an air-gap cylinder, which seals the rotor outward in a radial direction and prevents the cooling fluid from flowing out of the rotor in the radial direction,
wherein the hollow shaft has at least one radial inlet channel through which the cooling fluid can be led back into the hollow shaft, and
wherein the at least one radial inlet channel of the hollow shaft is arranged outside an area of the hollow shaft covered by the laminated core in a space enclosed by the air-gap cylinder.

2. The rotor according to claim 1, further comprising:
at least one cooling channel, which extends in the axial direction through the rotor and through the laminated core or between the laminated core and the air-gap cylinder.

3. The rotor according to claim 1, wherein seals are arranged at end faces of the air-gap cylinder between the hollow shaft and the air-gap cylinder, and prevent the cooling fluid from flowing out of the rotor in an axial direction in areas covered by the seals.

4. The rotor according to claim 1, wherein the at least one radial outlet channel of the hollow shaft is arranged outside an area of the hollow shaft covered by the laminated core in a space enclosed by the air-gap cylinder.

5. The rotor according to claim 1, wherein the air-gap cylinder is a non-magnetic material.

6. The rotor according to claim 1, wherein the cooling fluid is a liquid.

7. The rotor according to claim 1, wherein the cooling fluid is a transmission oil.

8. An asynchronous machine (ASM) comprising:
a stator and a rotor rotatably arranged therein, the rotor rotating about an axis of rotation,
wherein the rotor comprises:
a hollow shaft for passage of a cooling fluid, wherein the hollow shaft has at least one radial outlet channel for the cooling fluid;
a laminated core mounted on the hollow shaft, and on which a squirrel cage is arranged,
wherein a circumferential surface of the rotor is formed by an air-gap cylinder, which seals the rotor outward in a radial direction and prevents the cooling fluid from flowing out of the rotor in the radial direction,
wherein the air-gap cylinder is positioned in an air-gap between the rotor and the stator,
wherein the hollow shaft has at least one radial inlet channel through which the cooling fluid can be led back into the hollow shaft, and
wherein the at least one radial inlet channel of the hollow shaft is arranged outside an area of the hollow shaft covered by the laminated core in a space enclosed by the air-gap cylinder.

* * * * *